United States Patent
Mitchell et al.

[11] Patent Number: 6,095,230
[45] Date of Patent: Aug. 1, 2000

[54] VEHICLE SUN SHADES

[75] Inventors: Edward David Mitchell, Los Angeles, Calif.; Roger Kim, Belleville, Mich.; John Charles Cook, Ventura; Scott Paul McManigal, Santa Monica, both of Calif.

[73] Assignee: Quaker State Investment Corporation, Wilmington, Del.

[21] Appl. No.: 09/094,743

[22] Filed: Jun. 15, 1998

[51] Int. Cl.[7] ................................................. B60J 11/00
[52] U.S. Cl. ..................................... 160/370.21; 296/97.8
[58] Field of Search .................................... 160/377, 379, 160/370.21; 135/29, 30, 31; 296/97.7, 97.8, 97.1

[56] References Cited

U.S. PATENT DOCUMENTS

| | | | |
|---|---|---|---|
| 65,673 | 6/1867 | Holland et al. | 160/379 |
| D. 236,868 | 9/1975 | Levy | D6/139 |
| D. 236,869 | 9/1975 | Levy | D6/139 |
| D. 236,870 | 9/1975 | Levy | D6/139 |
| D. 237,663 | 11/1975 | Levy | D6/139 |
| D. 247,276 | 2/1978 | Smith | D6/184 |
| D. 291,430 | 8/1987 | Vartanian et al. | D12/191 |
| D. 314,934 | 2/1991 | Howes | D12/155 |
| 368,506 | 8/1887 | Berrien | 160/379 |
| 1,018,498 | 2/1912 | Ilse . | |
| 1,412,716 | 7/1922 | Ramoall . | |
| 1,547,538 | 7/1925 | Vincent | 135/31 |
| 1,756,227 | 4/1930 | Torrent | 160/379 |
| 1,769,315 | 7/1930 | Schoenhard | 135/31 |
| 1,944,696 | 1/1934 | Reichl | 45/196 |
| 1,987,259 | 1/1935 | Koehler | 296/97 |
| 2,437,845 | 3/1948 | Wyeth | 296/84 |
| 2,546,438 | 3/1951 | Graeill | 160/327 |
| 2,561,188 | 7/1951 | Ferguson | 160/23 |
| 2,599,014 | 6/1952 | Pritchard | 296/44 |
| 2,599,066 | 6/1952 | Osborn | 160/368 |
| 2,624,406 | 1/1953 | Szychowski et al. | 160/368 |
| 2,646,118 | 7/1953 | Berty | 168/369 |
| 2,651,543 | 9/1953 | Chonoski et al. | 296/97 |
| 2,715,042 | 8/1955 | Lancaster | 296/84 |
| 2,736,375 | 2/1956 | Rupert | 160/370.21 |
| 2,804,135 | 8/1957 | Sutton | 160/105 |
| 2,806,809 | 9/1957 | Schuh | 154/46 |
| 2,821,248 | 1/1958 | Irvine | 160/368 |
| 2,855,241 | 10/1958 | Walter | 296/97 |
| 2,897,002 | 7/1959 | Yovich . | |
| 2,922,676 | 1/1960 | Czajkowski | 296/97 |
| 2,991,119 | 7/1961 | Young | 296/97 |
| 3,003,812 | 10/1961 | Haugland | 296/97 |
| 3,042,445 | 7/1962 | Lamar | 296/97 |
| 3,069,021 | 12/1962 | Gray | 135/31 |
| 3,156,497 | 11/1964 | Lessard . | |
| 3,184,264 | 5/1965 | Ealey et al. | 296/95 |
| 3,252,468 | 5/1966 | Militano | 135/31 |
| 3,343,868 | 9/1967 | Manookian | 296/97 |
| 3,363,666 | 1/1968 | Hodgson et al. | 160/23 |
| 3,371,955 | 3/1968 | Herrington | 296/97 |
| 3,373,792 | 3/1968 | Lessard . | |

(List continued on next page.)

FOREIGN PATENT DOCUMENTS

| | | | |
|---|---|---|---|
| 35113 | 8/1975 | Australia . | |
| 674216 | 11/1963 | Canada | 296/88 |
| 2313226 | 12/1976 | France . | |
| 2531382 | 2/1984 | France . | |
| 2584902 | 1/1987 | France | 135/29 |
| 2630977 | 11/1989 | France . | |
| 704366 | 3/1941 | Germany | 135/29 |

(List continued on next page.)

OTHER PUBLICATIONS

U.S. application No. 09/148,956, Mitchell et al., filed Sep. 8, 1998.

*Primary Examiner*—Blair M. Johnson
*Attorney, Agent, or Firm*—Jenkens & Gilchrist A Profeesional Corporation

[57] ABSTRACT

A collapsible vehicle sun shade is presented that has a sheet of flexible material, with a central hub having a plurality of support members flexibly hinged to the hub and secured to positions along the outer periphery of the sheet.

69 Claims, 6 Drawing Sheets

U.S. PATENT DOCUMENTS

| | | | |
|---|---|---|---|
| 3,412,506 | 11/1968 | Shiota | 49/82 |
| 3,690,080 | 9/1972 | Dillard | 52/108 |
| 3,804,456 | 4/1974 | Boyle | 296/97 E |
| 3,880,461 | 4/1975 | Flanagan | 296/95 C |
| 4,202,396 | 5/1980 | Levy | 160/107 |
| 4,261,649 | 4/1981 | Richrad | 350/276 |
| 4,442,881 | 4/1984 | Monteath . | |
| 4,618,132 | 10/1986 | Kimura et al. | 296/97 |
| 4,635,993 | 1/1987 | Hooper et al. | 296/95 |
| 4,724,181 | 2/1988 | Mingenback | 160/379 |
| 4,749,222 | 6/1988 | Idland | 296/97 D |
| 4,758,041 | 7/1988 | Labeur | 296/97 G |
| 4,762,358 | 8/1988 | Levosky et al. | 296/97 G |
| 4,815,784 | 3/1989 | Zheng | 296/97.7 |
| 4,836,232 | 6/1989 | De Rosa et al. . | |
| 4,848,825 | 7/1989 | Niernberger | 296/95.1 |
| 4,862,943 | 9/1989 | Shafia | 160/370 |
| 4,863,210 | 9/1989 | Kenon | 296/136 |
| 4,869,542 | 9/1989 | Lin et al. | 296/97.8 |
| 4,874,026 | 10/1989 | Worral | 160/23.1 |
| 4,898,224 | 2/1990 | Woodworth | 160/310 |
| 4,902,062 | 2/1990 | Moluntska et al. | 296/97.4 |
| 4,923,239 | 5/1990 | Wiscusen et al. | 296/97.7 |
| 4,958,880 | 9/1990 | Champane | 296/97.7 |
| 4,964,667 | 10/1990 | Reis et al. | 296/95.1 |
| 5,004,285 | 4/1991 | Bennet | 296/1.1 |
| 5,024,262 | 6/1991 | Huang | 160/370.2 |
| 5,035,460 | 7/1991 | Huang | 296/95.1 |
| 5,036,898 | 8/1991 | Chen et al. | 160/23.1 |
| 5,042,866 | 8/1991 | Cody | 296/97.4 |
| 5,076,633 | 12/1991 | Hsu et al. | 296/97.4 |
| 5,085,473 | 2/1992 | Yang | 296/141 |
| 5,116,273 | 5/1992 | Chan | 160/370.2 |
| 5,135,279 | 8/1992 | Beatty | 296/97.1 |
| 5,158,334 | 10/1992 | Felland | 296/97.4 |
| 5,165,748 | 11/1992 | O'Connor | 296/97.6 |
| 5,213,147 | 5/1993 | Zheng | 160/370.2 |
| 5,253,695 | 10/1993 | Nenstiel | 160/370.2 |
| 5,314,226 | 5/1994 | Tovar | 296/97.7 |
| 5,355,903 | 10/1994 | Haddad et al. | 135/31 |
| 5,356,191 | 10/1994 | Sheehan | 296/95.1 |
| 5,379,822 | 1/1995 | Lenetz | 160/370.21 |
| 5,495,884 | 3/1996 | Shikler | 160/120 |
| 5,553,908 | 9/1996 | Shink | 296/978 |
| 5,562,142 | 10/1996 | Ziel | 160/370.21 |
| 5,611,364 | 3/1997 | Woods et al. | 135/31 |
| 5,632,318 | 5/1997 | Wang | 160/370.21 |

FOREIGN PATENT DOCUMENTS

| | | | |
|---|---|---|---|
| 1140475 | 6/1963 | Germany . | |
| 6609933 | 12/1972 | Germany . | |
| 5668 | 12/1978 | Israel . | |
| 5669 | 12/1978 | Israel . | |
| 5672 | 12/1978 | Israel . | |
| 5673 | 12/1978 | Israel . | |
| 5679 | 12/1978 | Israel . | |
| 42807 | 9/1959 | Poland | 135/28 |
| 73/3854 | 6/1973 | South Africa . | |
| 745006 | 12/1974 | South Africa . | |
| 12059 | 5/1975 | Spain . | |
| 205939 | 7/1966 | Sweden . | |
| 673439 | 3/1990 | Switzerland . | |
| 1288 | of 1853 | United Kingdom | 135/29 |
| 110573 | 10/1917 | United Kingdom | 135/29 |
| 200635 | 7/1923 | United Kingdom . | |
| 859268 | 1/1961 | United Kingdom . | |
| 1106275 | 3/1968 | United Kingdom | 135/29 |

VEHICLE SUN SHADES

BACKGROUND

The invention relates to collapsible sun shades for protecting the interior of automobiles against unwanted exposure to the sun. The sun shades of the present invention may be extended behind the windshield or windows of an automobile to act as a barrier to sunlight, reducing heat buildup within the vehicle interior and undesired weathering of the vehicle interior from exposure to sunlight.

In general, vehicle sun shades may be positioned to shield a vehicle interior from either an interior or exterior location. As an example, interior sun shades include folding cardboard sun shades for placement behind vehicle windshields such as shown in the patent to Levy, U.S. Pat. No. 4,202,396. Other types of interior windshield sun shades include fan-like venetian blind arrangements, and designs consisting of fabric supported by elongated loops of spring-like material.

In addition to the interior sun shades, exterior sun shades may also be used. For example, an exterior sun shade may consist of a thin layer of fabric or plastic to lie on the exterior surface of the windshield.

SUMMARY

In general, in one aspect, the invention includes collapsible vehicle sun shades including a sheet of flexible material, a hub, and a plurality of support members connected to the hub and secured to positions along an outer periphery of the sheet.

In general, in another aspect, the invention includes vehicle sun shades including a sheet of flexible material, a hub, and a plurality of support members connected to the hub by releasable locking joints or hinges.

In general, sun shades under the present invention may be releasably locked in an open position where the sheet is extended by the support members, and may also be placed in a closed position where the sheet is collapsed by the support members.

DETAILED DESCRIPTION

Figure 1:
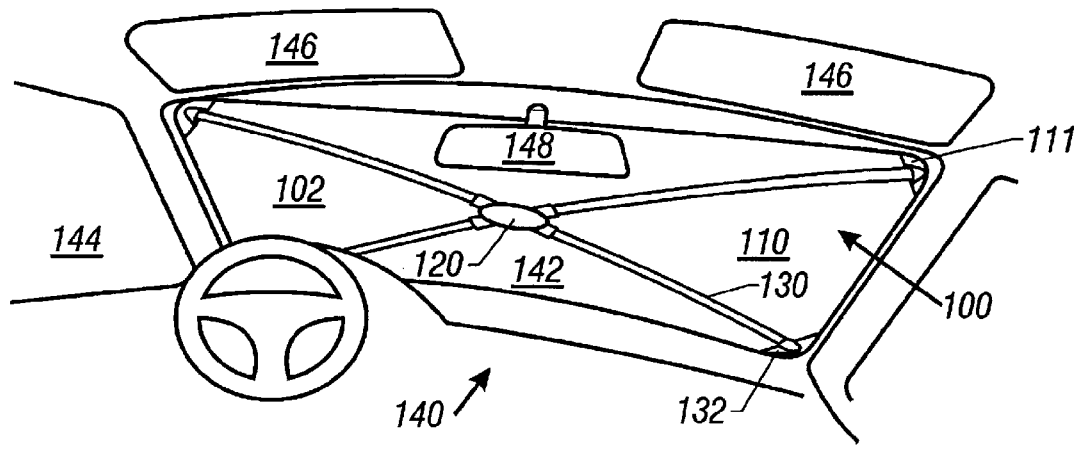
FIG. 1 is a perspective view of a collapsible sun shade in an open position beneath a vehicle windshield.

The improved vehicle sun shade of the present invention is collapsible, having a flexible sheet supported by a hub and radial support members that may be pivoted to place the sun shade in both an open and a closed position. Embodiments of the present invention may be light weight, easily storable, and durable.

In one embodiment of the present invention, a nylon fabric sheet is used that has a silver coloring or coating suitable for reflecting sun light, such as a polyurethane coating. In other embodiments, the sheet may also be made from other flexible materials, including fabrics suitable for reflecting light and heat radiation.

In some embodiments, sun shade hubs may be made of a resilient material, such as rubber or a flexible polymer. As to the support members, they may be made of a resilient material that provides the members with spring-like qualities. Such materials might include metals and plastics. The support members can have a variety of configurations including springs, rods, tubes, flat beams and rods within tubes.

In general, flexibility and resiliency in the hubs and support members can be utilized to provide a sun shade that is biased in an open position, but that can also be folded into a closed position.

In one embodiment, the hub includes a flexible material in the shape of a cylinder that can be used to secure the sun shade in a closed position by folding the cylinder-shaped part of the hub inside-out around the hub-end of the closed sun shade.

Embodiments of the present invention also include hubs and support members that are made from substantially rigid materials. Such embodiments may include releasable locking joint mechanisms at the connection between the hub and each support member whereby the sun shade can be releasably locked in an open position. Such releasable locking joint mechanisms may include hinges that releasably snap between various positions, and hinges that are biased toward a particular position by a spring.

Flexibility between the hub and support members may be provided by hinges or joints, which may be located on the hub, the support members, or as a discrete component fitting between the hub and support members.

In one embodiment of the present invention, a hub is attached to the sheet and the hub is connected with radially extending, resilient support members that are each fixed to the corners of the sheet. The length of the support members are longer than an adjacent length of the sheet measured from the hub to the secured position of the support members at the corners of the sheet.

In this embodiment, the support members are connected to the hub so that they can only be pivoted between a closed position of the sun shade, where the support members are positioned to collapse the sheet, and an extended position, where each of the support members is pivoted into substantially the same plane to place the sun shade into an open position.

Since each support member is longer than the length of sheet between the hub and the corner of the sheet where the member is secured, each support members is bowed between the hub and the corner of the sheet where the member is secured. When the support members are pivoted into substantially the same plane, the ends of the support members at the sheet corners can be extended to bow in a direction opposite from a closed position of the sun shade. As the sheet is extended in this manner, the sun shade is releasably locked into an open position by the bowing of the support members.

In embodiments of the present invention, the sun shade in an open position may have a profile of various shapes, including squares, rectangles trapezoids, circles, ovals, and particular vehicle windshield and window shapes.

Additionally, embodiments of the present invention may be generally made from cushion-like materials, such as hubs or support members made from polymer foams or having padding secured to them. Such embodiments may provide improved functionality. For example, a sun shade in such embodiments may be used in a closed position as a pillow.

Referring to FIG. 1, a perspective view is shown of a collapsible sun shade 100 under the present invention that is in an extended position 102 in a vehicle interior 140 beneath a vehicle windshield 142. In some embodiments, a sun shade 100 may also be sized to fit a vehicle window 144, or half of the vehicle-windshield 142. In FIG. 1, the sun shade 100 is positioned to rest upon the rear-view mirror 148 to hold the sun shade 100 in place. The vehicle sun visors 146 may also be pivoted (not shown) to hold the sun shade 100 in place.

In general, the sun shade 100 comprises a sheet 110 that is supported by a hub 120 having radially extending support members 130. The support members 130 are connected to the hub 120 and extend radially to secured positions 132 along an outer periphery 112 of the sheet 110. The secured positions 132 may comprise pockets 111 that are stitched to the sheet 110. In some embodiments, the support members 130 may also be secured to the sheet 110 by other means including riveting and gluing (not shown).

Figure 2:
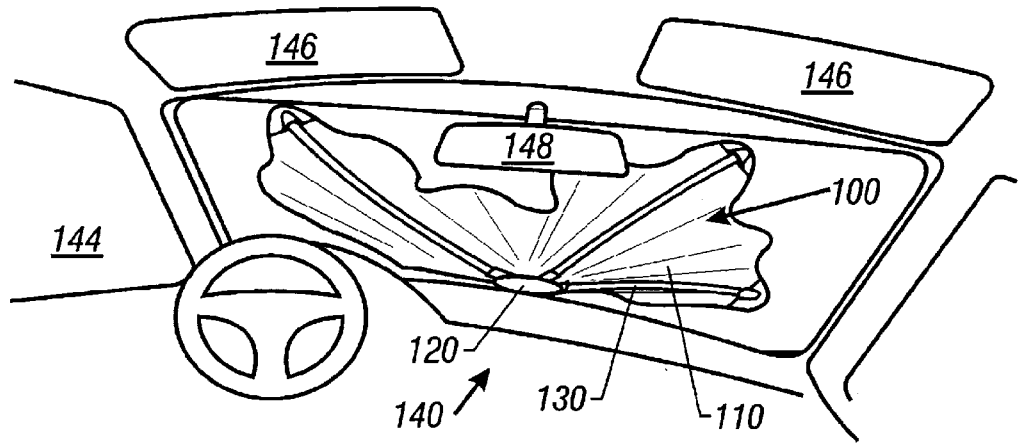
FIG. 2 is a perspective view of a collapsible sun shade in a partially closed position beneath a vehicle windshield.
Figure 4:
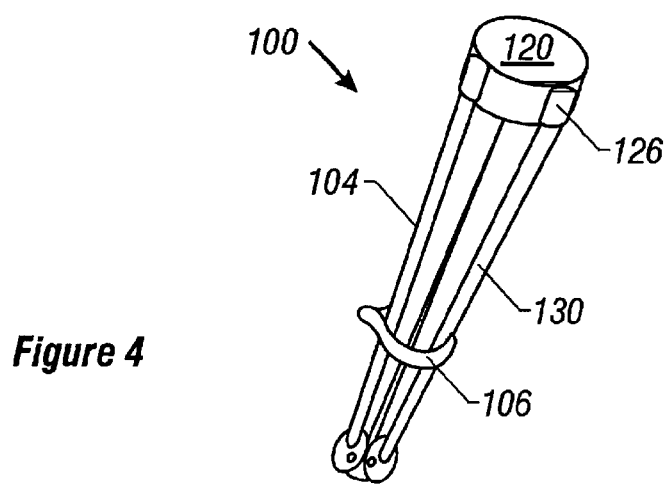
FIG. 4 is a perspective view of a collapsible sun shade in a closed position.

Referring to FIG. 2, a perspective view is shown of a collapsible sun shade 100 under the present invention that is in a partially closed position beneath a vehicle windshield 142. When the sun shade 100 is in a fully closed position 110 (FIG. 4), the support members 130 are pivoted at the hub 120 to collapse the sheet 110. FIG. 4 illustrates one embodiment where a strap 106 may be secured to the sun shade 100 that may be fastened around the sun shade 100 when in the closed position 110 to maintain the sun shade 100 in the closed position 110.

Figure 3:
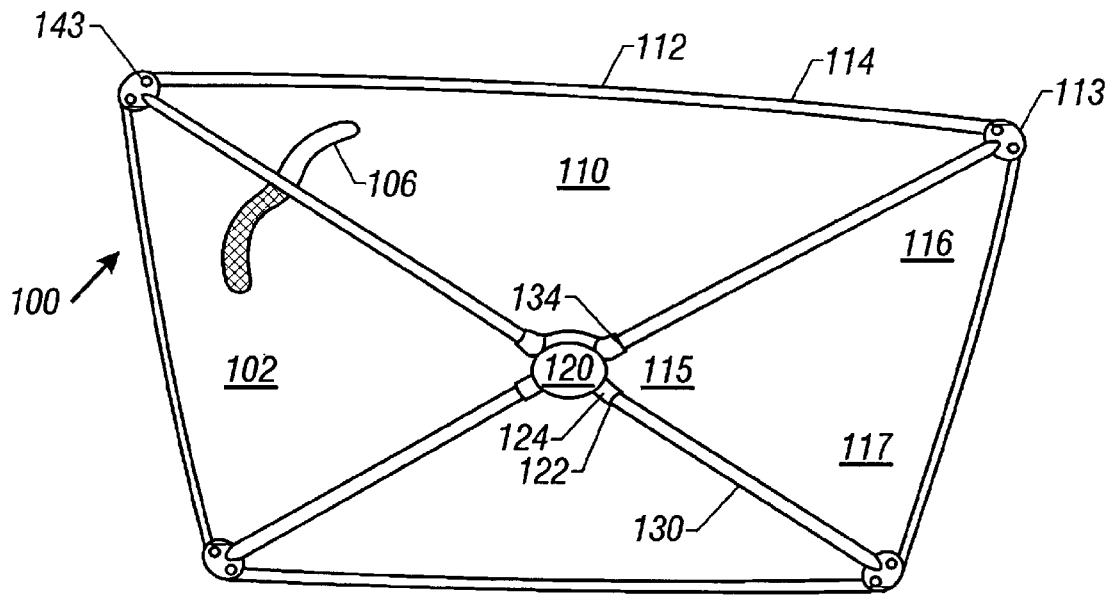
FIG. 3 is a perspective view of a collapsible sun shade in an open position.

Referring to FIG. 3, a perspective view is shown of a collapsible sun shade 100 under the present invention that is in an open position 102. The sheet 110 has a substantially rectangular shape 117 and is made from a flexible material 116 supported by a hub 120 that is secured to the sheet 110 at substantially the center of the sheet 115. A hem 114 is secured along an outer periphery 112 of the sheet 110.

In the embodiment shown in FIG. 3, there are four support members 130, each extending radially from the hub 120 to a corner 113 of the sheet 110. The support members 130 are secured to the sheet 110 at the corners 113 by rivets 143. In other embodiments, alternative methods may be used to secure the support members 130 to the sheet 110, including gluing and stitching (not shown).

The support members 130 are flexibly connected 134 to the hub 120. The flexible connection 134 may comprise forcing each support member 130 into an opening 122 in the hub 120. The support members 130 may also be held in place by the hub 120 which may be held together by a screw 128 (see FIG. 5). The hub 120 may also be a molded shape with a plurality of necks 124 that each provide an opening 122 into which a support member 130 may be inserted.

In one embodiment, the hub 120 is made of a resilient, elastic material such as rubber, and the openings 122 are stretched around the support members 130 as the support members 130 are inserted into the hub 120. The necks 124 of the hub 120 may serve as a flexible joint 126 (FIG. 4) between the support members 130 and the hub 120, allowing the support members 130 to be pivoted at the hub 120. In such an embodiment, the resilient necks 124 bias the sun shade 100 in an open position 102 where the sheet 110 is extended by the support members 130, but also allow the support members 130 to be pivoted at the hub 120 to place the sun shade 100 in a closed position 110 where the sheet 110 is collapsed by the support members 130.

Figure 5:
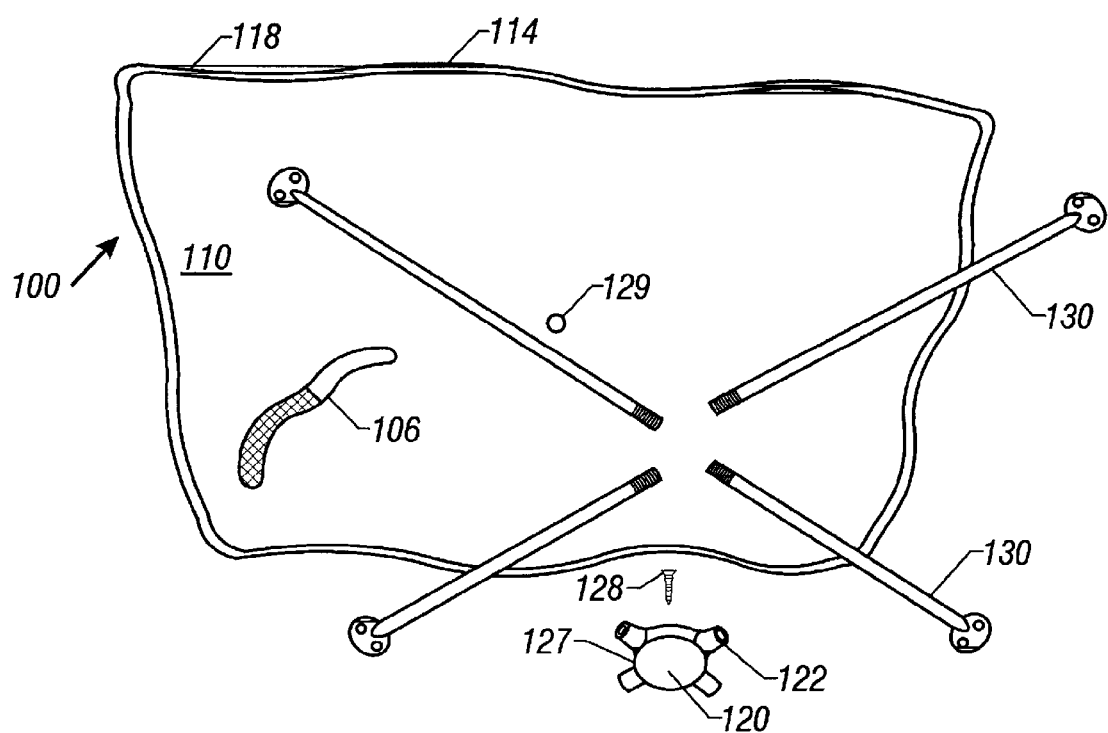
FIG. 5 is an exploded perspective view of a sun shade.

Referring to FIG. 5, an exploded perspective view is shown of a sun shade 100 under an embodiment of the present invention. The hub 120 comprises a first hub piece 127 and a second hub piece not shown that are mated through a hole 129 by a screw 128 in the sheet 110. The hub 120 is made of a resilient material such as rubber. The support members 130 are joined to the hub 120 by forcing the support members 130 into openings 122 in the hub 120. Since the hub 120 is made from a resilient material, the sun shade 100 is biased in an open position, but the support members 130 can also be folded to place the sun shade in a closed position 110 as shown in FIG. 4.

Figure 6:
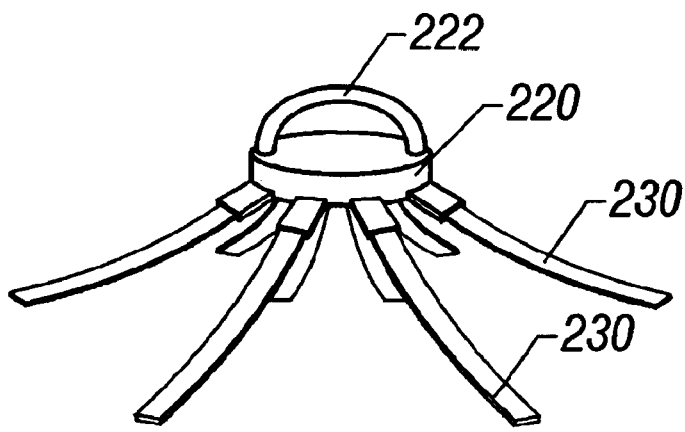
FIG. 6 is a perspective view of a sun shade hub joined with support members.

Referring to FIG. 6, a perspective view is shown of a sun shade hub 220 under the present invention that is a molded shape that includes a handle 222 suitable for grasping the hub 220. In other embodiments, the hub 220 may also include an attached handle (not shown) that is not part of the hub 220. The handle 222 may be grasped to assist placing the sun shade in an open or closed position.

Figure 7:
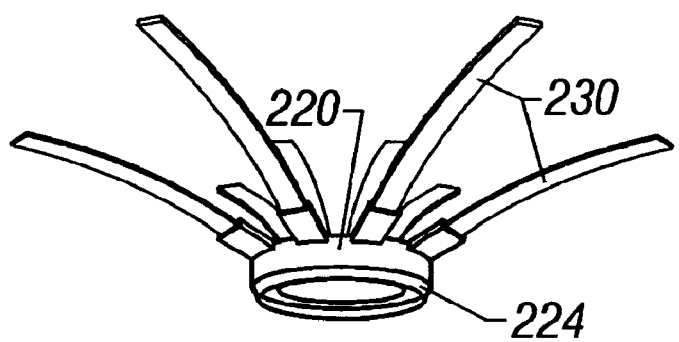
FIG. 7 is a perspective view of a sun shade hub joined with support members.

Referring to FIG. 7, a perspective view is shown of a sun shade hub 220 under the present invention that is a molded shape that includes a suction cup 224 suitable for adhering the sun shade to a vehicle windshield (not shown). In other embodiments, the hub 220 may also include an attached suction cup (not shown) that is not part of the hub 220.

Figure 8:
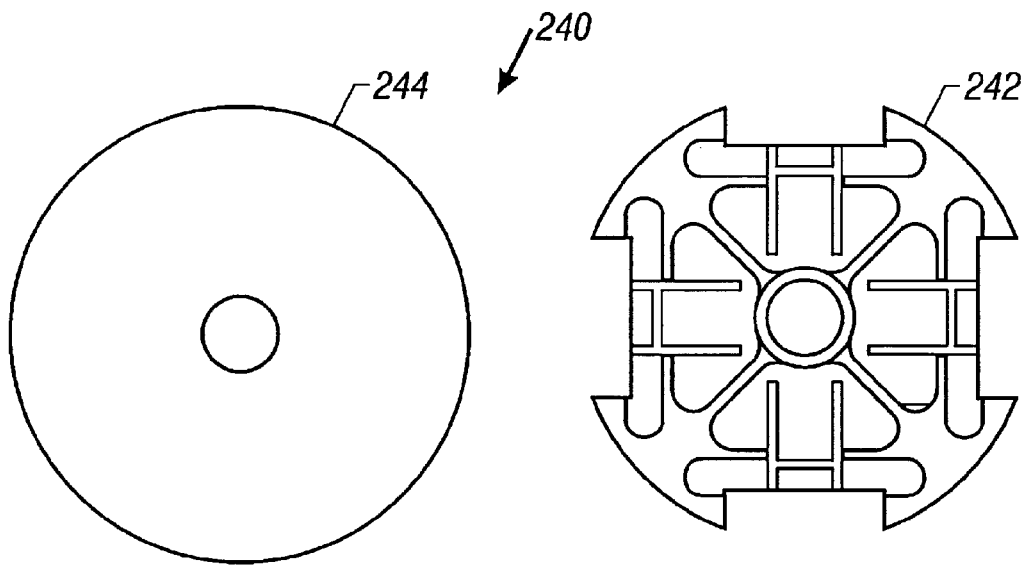
FIG. 8 is an exploded perspective view of a sun shade hub.
Figure 9:
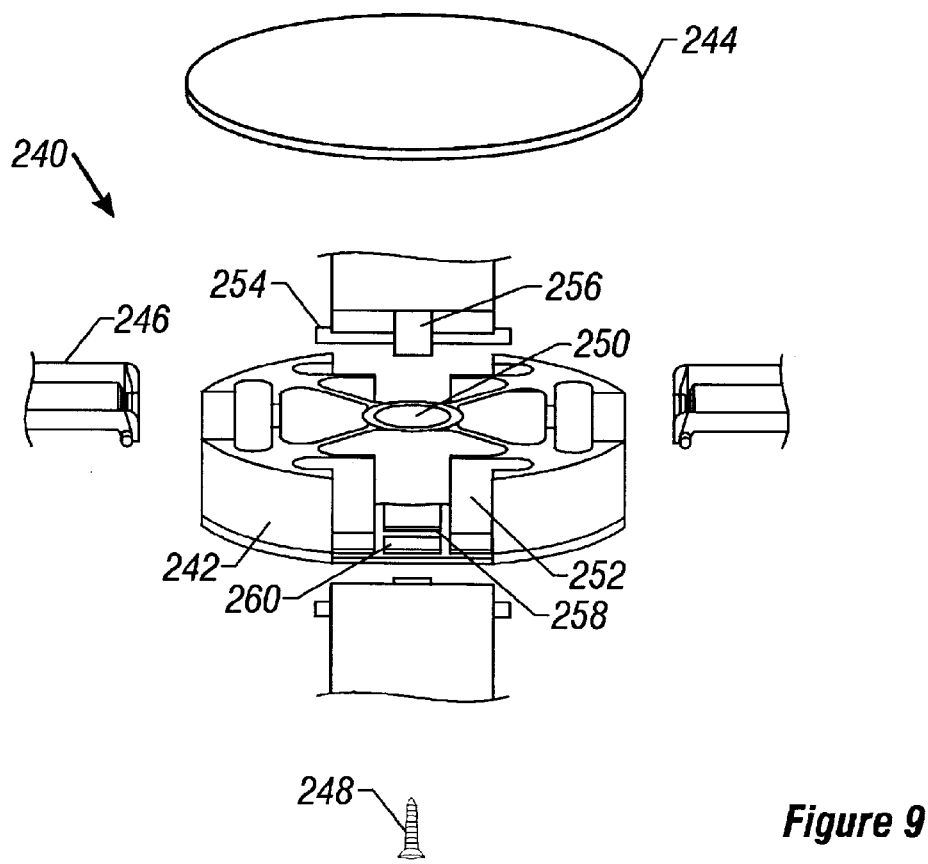
FIG. 9 is an exploded perspective view of a sun shade hub joined with support members.

Referring to FIG. 8, an exploded perspective view is shown of a sun shade hub 240 that comprises a first hub piece 242 and a second hub piece 244. Referring to FIG. 9, an exploded perspective view is shown of the sun shade hub of FIG. 8 together with support members 246. The first hub piece 242 and second hub piece 244 are joined together by a fastening screw 248.

The hub first piece 242 has a central fastening aperture 250 to accommodate the fastening screw 248. The hub first piece 242 also has support member grooves 252 to accommodate support members 246. Each support member 246 includes a hinge portion 254 that fits into a support member slot 252 to allow the support member 246 to pivot about the hub 240. The hinge portion of each support member 254 is held in a support member slot 252 when the first hub piece 242 and second hub piece 244 are joined by the fastening screw 248.

The support members 246 include locking tabs 256 that releasably engage locking grooves 258 when the support members 246 are extended radially from the hub 240 in an open position 102 (FIG. 3). Each locking groove 258 is formed on a flexible tab 260 that extends from the center of the hub first piece 242 along the bottom of a support member groove 252. Resilient deformation of the flexible tabs 260 allows the locking tabs 256 on the support members 246 to releasably engage the locking grooves 258.

In an alternative embodiment (not shown), the locking grooves 258 may be formed directly on the support member slots 252, and resilient deformation of the locking tabs 256 can allow the support members 246 to releasably engage the locking grooves 258.

Referring to FIG. 9, the support member slots 252 are located on the hub first piece 242 and shaped such that when the hub second piece 244 is fastened to the hub first piece 242, the support members 246 are limited in their range of pivot about the hub 240 by the hub second piece 244. This relationship allows the support members to be pivoted between a closed position 110 (FIG. 4), and an open position 102 (FIG. 3).

Figure 10:
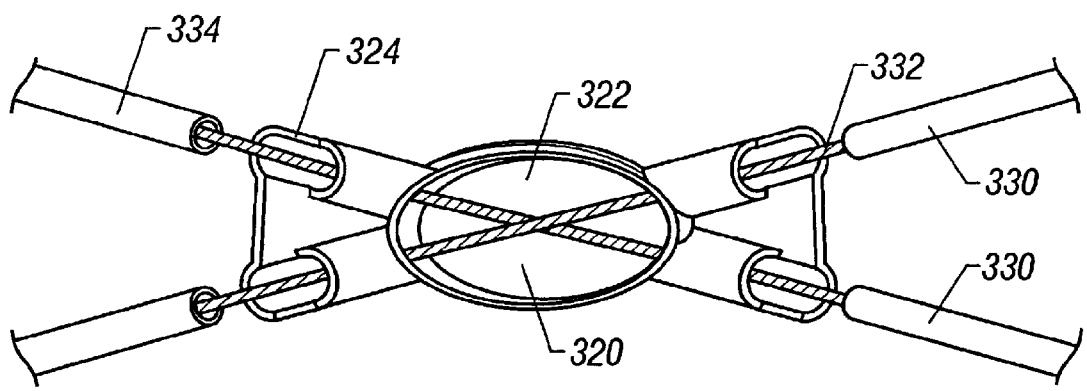
FIG. 10 is a perspective view of a sun shade hub and support members.

Referring to FIG. 10, a perspective view is shown of a sun shade hub 320 and support members 330. The support members 330 comprise hollow, tubular support member casings 334 that enclose resilient rods 332. The hub 320 is a molded shape that includes joints 324. The support member casings 334 are placed into the joints 324. The rods 332 extend from a secured position on the sheet (not shown), through a support member casing 334, through a joint 324, through the hollow cavity 322 of the hub 320, and through another joint 324 and support member casing 334 to another secured position on the sheet (not shown).

In a sun shade embodiment having the hub and member configuration shown in FIG. 10, the rods 332 serve to bias the sun shade in an open position. The rods 332 can be resiliently bent at the joints 324 to place the sun shade in a closed position as shown in FIG. 4.

Figure 11:
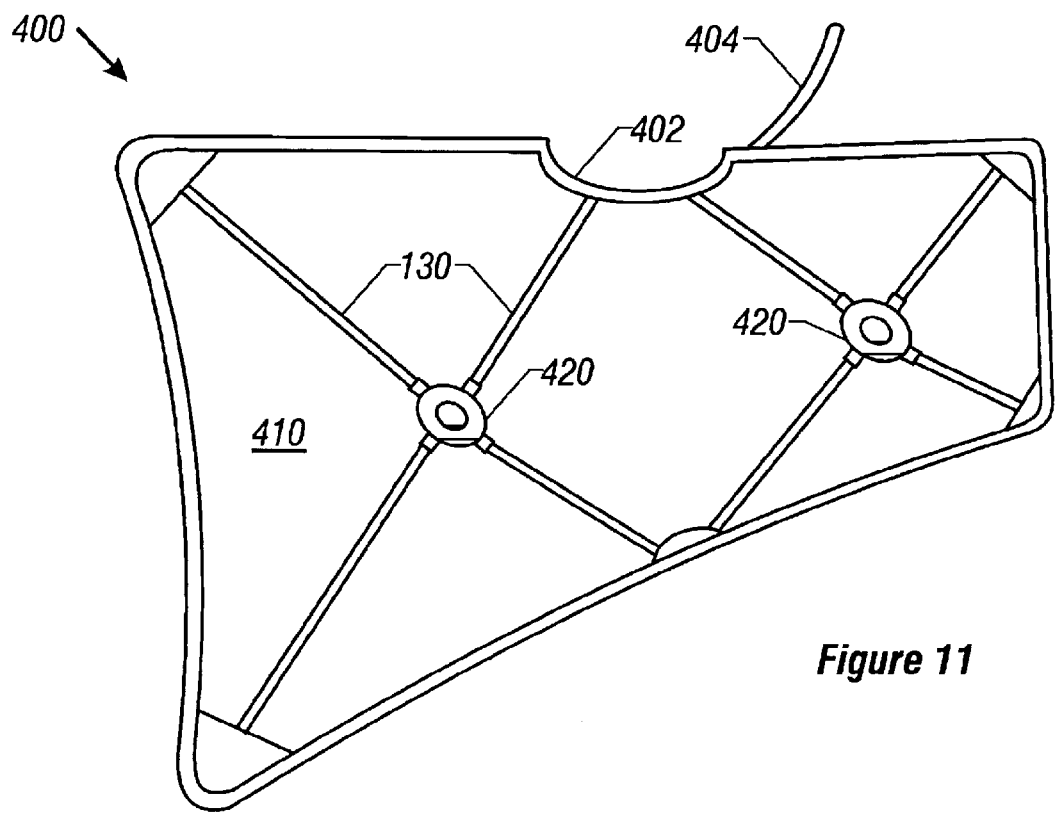
FIG. 11 is a perspective view of a vehicle sun shade.

Referring to FIG. 11, a perspective view of a sun shade 400 under the present invention is shown that has two hubs 420, each having a plurality of radially extending support members 430. The sheet 410 has substantially the shape of a vehicle windshield (not shown), including a taper area 402 to accommodate a rear-view mirror 148 as shown in FIG. 1. Additionally, the embodiment shown in FIG. 11 has a strap 404 for attachment to a rear-view mirror 148.

Other embodiments are within the scope of the following claims. Although the present invention has been described with reference to specific exemplary embodiments, various modifications and variations may be made to these embodiments without departing from the spirit and scope of the invention as set forth in the claims.

What is claimed is:

1. A vehicle sun shade comprising:
    a sheet of a flexible material having a central portion and an outer periphery, the sheet defining substantially a plane when extended;
    a hub located at the central portion of the sheet; and
    a plurality of elongate support members, each support member having a first end connected to the hub by a pivoted connection and having a second end fixed to a secured position on the outer periphery of the sheet;
    wherein the sun shade has an open position where each of the support members lies substantially in the plane, and a closed position which is obtained by pivoting each of the support members around the hub and out of the plane so as be substantially parallel, to
    wherein the sun shade is free of any support member oriented substantially perpendicular to the plane when the sun shade is in the open position.

2. The vehicle sun shade of claim 1, wherein the support members are bowed in the open position.

3. The vehicle sun shade of claim 1, wherein the support members are flexibly hinged to the hub at said pivoted connection.

4. The vehicle sun shade of claim 1, wherein the hub is secured to the sheet.

5. The vehicle sun shade of claim 1, wherein the hub is secured to the sheet, the hub comprising a first hub piece and a second hub piece on opposite sides of the sheet, the first hub piece and second hub piece being mated through a hole in the sheet.

6. The vehicle sun shade of claim 5, wherein the hub has a hub front side and a hub back side, and the hub back side has a shape suitable for grasping the hub.

7. The vehicle sun shade of claim 5, wherein the hub has a hub front side and a hub back side, and the hub back side has a handle secured to the hub.

8. The vehicle sun shade of claim 5, wherein one of the first hub piece and second hub piece is a suction cup.

9. The vehicle sun shade of claim 5, further comprising a suction cup secured to the hub.

10. The vehicle sun shade of claim 1, wherein the sheet has four corners, and wherein there are four support members, each support member extending from the hub to a corner of the sheet.

11. The vehicle sun shade of claim 1, wherein the sheet has four corners, and wherein a first support member extends from a first corner of the sheet through the hub to a second corner of the sheet that is diagonally opposed to the first corner of the sheet, and a second support member extends from a third corner of the sheet through the hub to a fourth corner of the sheet that is diagonally opposed to the third corner of the sheet.

12. The vehicle sun shade of claim 11, further comprising support member casings.

13. The vehicle sun shade of claim 1, wherein each support member is joined to the hub by placing an end of the support member into an opening in the hub.

14. The vehicle sun shade of claim 1, wherein the hub is made of a resilient material.

15. The vehicle sun shade of claim 1, wherein the support members are made of a resilient material.

16. The vehicle sun shade of claim 15, wherein the support members are made from a material selected from the group consisting of metals and plastics.

17. The vehicle sun shade of claim 1, wherein the support members are substantially rigid.

18. The vehicle sun shade of claim 17, wherein the support members are tubular.

19. The vehicle sun shade of claim 17, wherein the support members are flat beams.

20. The vehicle sun shade of claim 1, wherein each support member is secured to the outer periphery of the sheet by a method selected from the group consisting of stitching, riveting and gluing.

21. The vehicle sun shade of claim 1, wherein each support member extends from the hub to a pocket secured to the sheet.

22. The vehicle sun shade of claim 1, wherein each support member has a joint adjacent to the connection of the support member to the hub.

23. The vehicle sun shade of claim 1, wherein each support member is joined to the hub by a releasable locking joint.

24. The vehicle sun shade of claim 1, wherein each support member is joined to the hub by a hinge.

25. The vehicle sun shade of claim 1, wherein the support members are made from a cushion material.

26. The vehicle sun shade of claim 1, further comprising a padding secured to the support members.

27. The vehicle sun shade of claim 1, wherein the sun shade in the open position has a profile selected from the group of shapes consisting of squares, rectangles, trapezoids, circles and ovals.

28. The vehicle sun shade of claim 1, wherein the sun shade in the open position has a profile that is substantially the same as a profile of a vehicle windshield.

29. The vehicle sun shade of claim 1, wherein the extended sun shade has a profile that is substantially the same as a profile of a vehicle window.

30. The vehicle sun shade of claim 1, wherein the sheet has a shape selected from the group consisting of squares, rectangles, trapezoids, circles and ovals.

31. The vehicle sun shade of claim 1, wherein the sheet is a fabric selected from the group consisting of nylon and polyester films.

32. The vehicle sun shade of claim 1, wherein the sheet comprises a material suitable for reflecting light and heat radiation.

33. The vehicle sun shade of claim 1, further comprising a hem secured to the sheet along the outer periphery of the sheet.

34. The vehicle sun shade of claim 1, further comprising a strap secured to the sun shade that may be fastened around the sun shade when the sun shade is in the closed position to maintain the sun shade in the closed position.

35. The vehicle sun shade of claim 1, further comprising a taper area to accommodate a rear-view mirror.

36. The vehicle sun shade of claim 1, further comprising a strap for attachment to a rear-view mirror.

37. A vehicle sun shade comprising:

a sheet of a flexible material composed of at least two adjacent regions, the sheet defining substantially a plane when extended, the sheet having an outer periphery;

a first hub located in a first region;

a second hub located in a second region;

a plurality of first elongate support members, each first support member having a first end connected to the first hub by a first pivoted connection and having a second end fixed to a secured position on the outer periphery of the sheet; and a plurality of second elongate support members, each second support member having a first end pivotally connected to the second hub by a second pivoted connection and having a second end fixed to a secured position on the outer periphery of the sheet;

wherein the sun shade has an open position where each of the first and second support members lies substantially in the plane, and a closed position which is obtained by pivoting each of the first and second support members around a respective hub and out of the plane so that said first support members are substantially parallel to each other and said second support members are substantially parallel to each other, wherein the sun shade is free of any support member oriented substantially perpendicular to the plane when the sun shade is in the open position.

38. The vehicle sun shade of claim 37, wherein the first and second support members are bowed in the open position.

39. The vehicle sun shade of claim 37, wherein the first and second support members are flexibly hinged to the hub at said pivoted connection.

40. The vehicle sun shade of claim 37, wherein the first and second hubs are secured to the sheet.

41. The vehicle sun shade of claim 37, wherein the first and second hubs are secured to the sheet, each of the hubs comprises a first hub piece and a second hub piece on opposite sides of the sheet, the first hub piece and second hub piece are mated through a hole in the sheet.

42. The vehicle sun shade of claim 41, wherein each of the hubs has a hub front side and a hub back side, and the hub back side has a shade suitable for grasping the hub.

43. The vehicle sun shade of claim 41, wherein each of the hubs has a hub front side and a hub back side, and the hub back side has a handle secured to the hub.

44. The vehicle sun shade of claim 41, wherein one of the first hub piece and second hub piece is a suction cup.

45. The vehicle sun shade of claim 41, further comprising a suction cup secured to one of the hubs.

46. The vehicle sun shade of claim 37, wherein each support member is joined to a respective hub by placing an end of the support member into an opening in the hub.

47. The vehicle sun shade of claim 37, wherein each of the hubs is made of a resilient material.

48. The vehicle sun shade of claim 37, wherein the first and second support members are made of a resilient material.

49. The vehicle sun shade of claim 48, wherein the support members are made from a material selected from the group consisting of metals and plastics.

50. The vehicle sun shade of claim 37, wherein the first and second support members are substantially rigid.

51. The vehicle sun shade of claim 50, wherein the support members are tubular.

52. The vehicle sun shade of claim 50, wherein the support members are flat beams.

53. The vehicle sun shade of claim 37, wherein each support member is secured to the outer periphery of the sheet by a method selected from the group consisting of stitching, riveting and gluing.

54. The vehicle sun shade of claim 37, wherein each support member extends from a respective hub to a pocket secured to the sheet.

55. The vehicle sun shade of claim 37, wherein each support member has a joint adjacent to the connection of the support member to a respective hub.

56. The vehicle sun shade of claim 37, wherein each support member is joined to a respective hub by a releasable locking joint.

57. The vehicle sun shade of claim 37, wherein each support member is joined to a respective hub by a hinge.

58. The vehicle sun shade of claim 37, wherein the first and second support members are made from a cushion material.

59. The vehicle sun shade of claim 37, further comprising a padding secured to the first and second support members.

60. The vehicle sun shade of claim 37, wherein the sun shade in the open position has a profile selected from the group of shades consisting of squares, rectangles, trapezoids, circles and ovals.

61. The vehicle sun shade of claim 37, wherein the sun shade in the open position has a profile that is substantially the same as a profile of a vehicle windshield.

62. The vehicle sun shade of claim 37, wherein the extended sun shade has a profile that is substantially the same as a profile of a vehicle window.

63. The vehicle sun shade of claim 37, wherein the sheet has a shape selected from the group consisting of squares, rectangles, trapezoids, circles and ovals.

64. The vehicle sun shade of claim 37, wherein the sheet is a fabric selected from the group consisting of nylon and polyester films.

65. The vehicle sun shade of claim 37, wherein the sheet comprises a material suitable for reflecting light and heat radiation.

66. The vehicle sun shade of claim 37, further comprising a hem secured to the sheet along the outer periphery of the sheet.

67. The vehicle sun shade of claim 37, further comprising a strap secured to the sun shade that may be fastened around the sun shade when the sun shade is in the closed position to maintain the sun shade in the closed position.

68. The vehicle sun shade of claim 37, further comprising a taper area to accomodate a rear-view mirror.

69. The vehicle sun shade of claim 37, further comprising a strap for attachment to a real-view mirror.

* * * * *

UNITED STATES PATENT AND TRADEMARK OFFICE
CERTIFICATE OF CORRECTION

PATENT NO. : 6,095,230  Page 1 of 1
DATED : August 1, 2000
INVENTOR(S) : Edward David Mitchell, Roger Kim, John Charles Cook, Scott Paul McManigal It is certified that error appears in the above-identified patent and that said Letters Patent is hereby corrected as shown below:

Column 5, claim 1,
Line 49, after "as" insert -- to --.
Line 49, after "parallel" delete ",".
Line 49, after "parallel to" insert -- each other --.

Column 8, claim 60,
Line 39, delete "shades" and insert -- shapes --.

Signed and Sealed this

First Day of January, 2002

Attest:

JAMES E. ROGAN
Attesting Officer   Director of the United States Patent and Trademark Office